No. 840,062. PATENTED JAN. 1, 1907.
H. F. W. HUEG.
DOUGH DIVIDING MACHINE.
APPLICATION FILED MAY 24, 1906.
3 SHEETS—SHEET 2.
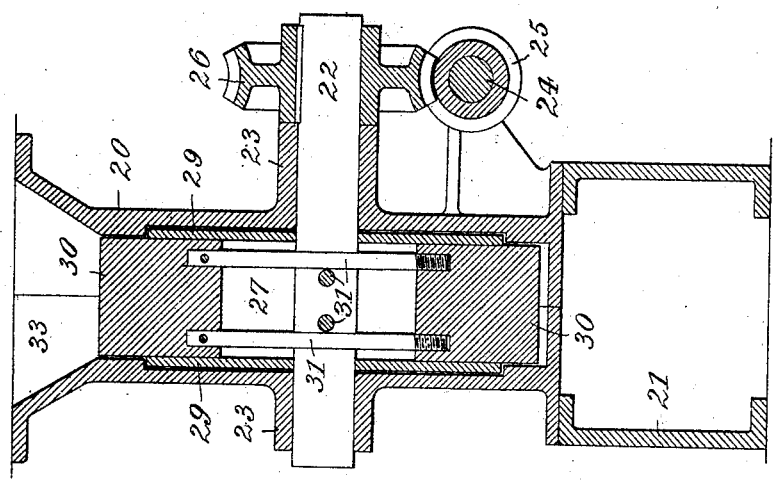
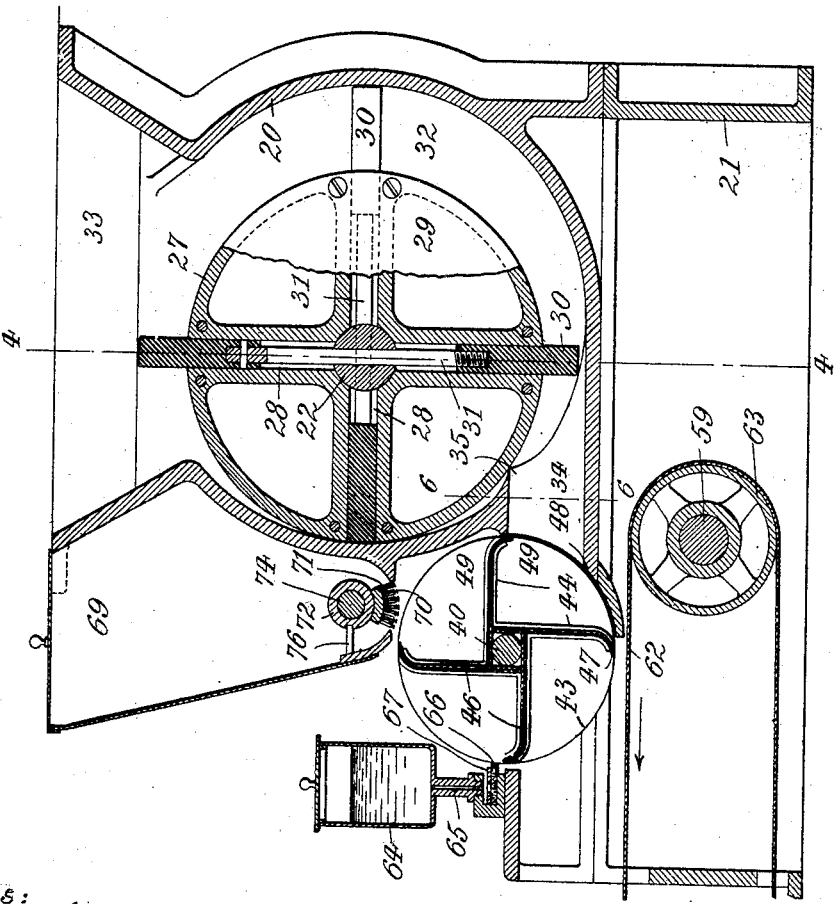

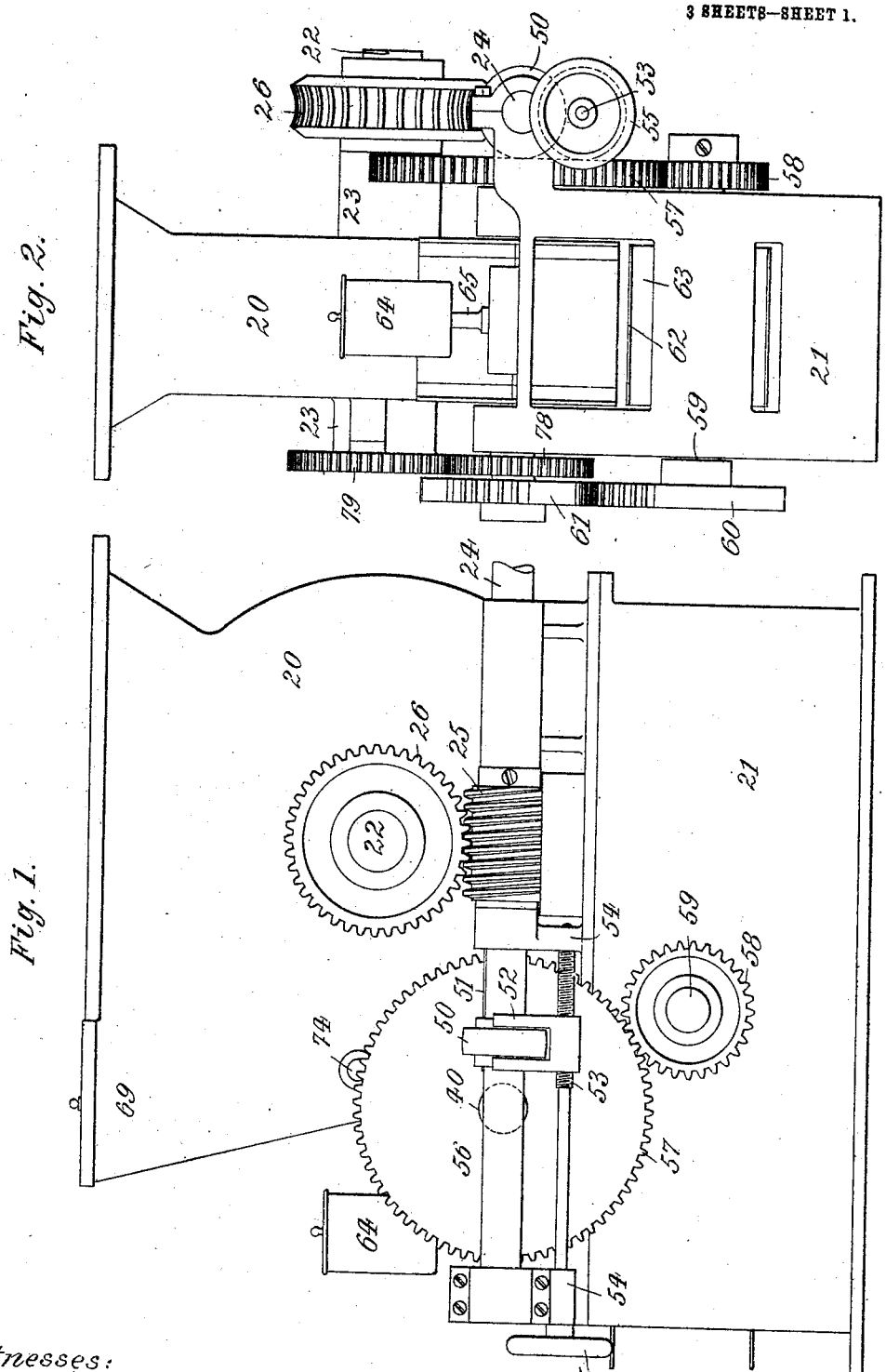

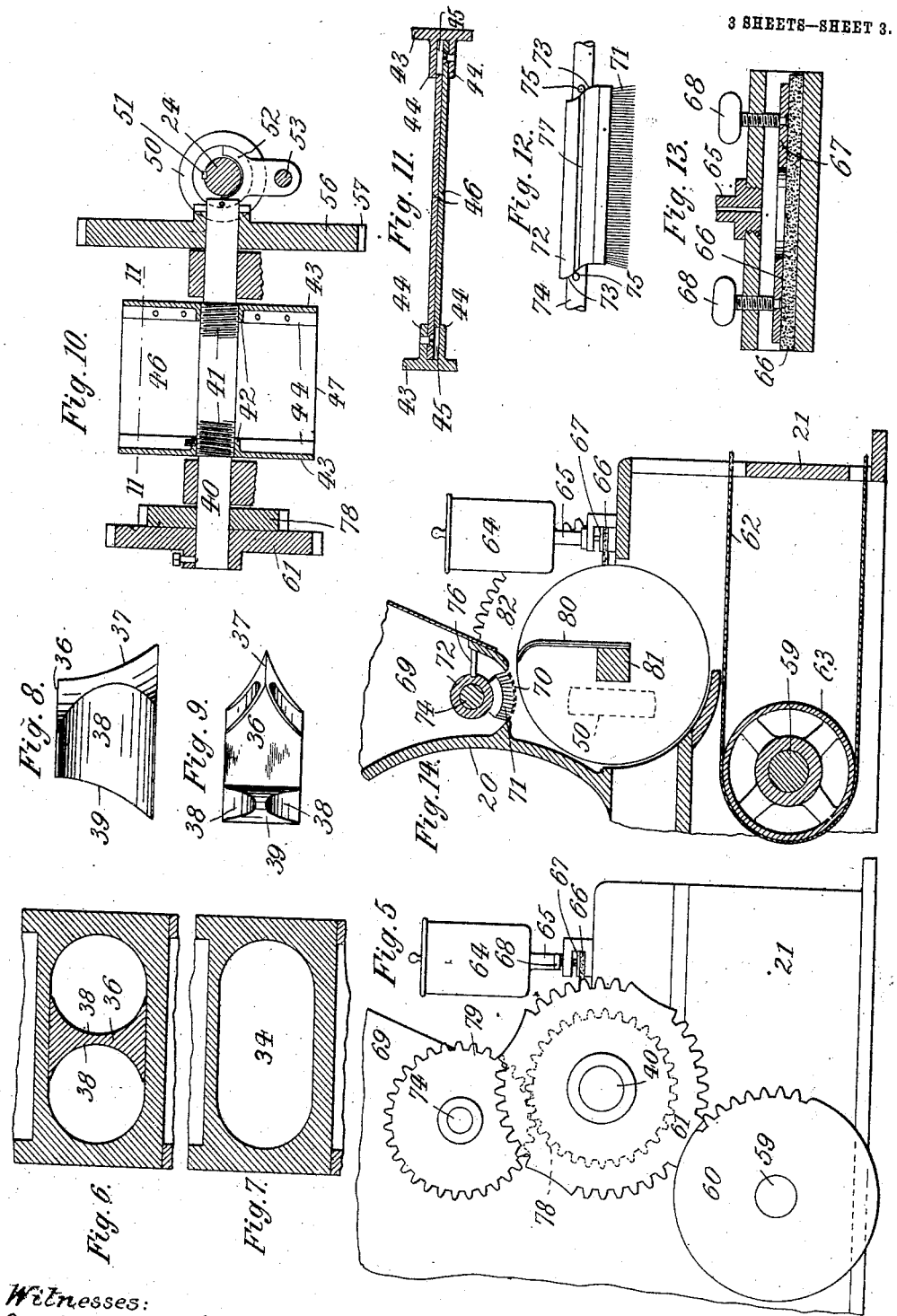

UNITED STATES PATENT OFFICE.

HERMAN F. W. HUEG, OF NEW YORK, N. Y.

DOUGH-DIVIDING MACHINE.

No. 840,062.　　　Specification of Letters Patent.　　　Patented Jan. 1, 1907.

Application filed May 24, 1906. Serial No. 318,461.

*To all whom it may concern:*

Be it known that I, HERMAN F. W. HUEG, a citizen of the United States, residing at New York city, borough of Queens, county of Queens, State of New York, have invented new and useful Improvements in Dough-Dividing Machines, of which the following is a specification.

This invention relates to a machine for dividing dough into uniform pieces of predetermined weight or size.

The invention embraces more particularly novel means for feeding the dough to the cutter and to a novel construction of the cutter and cutter-operating means.

It also embraces various other features of construction, all as more fully pointed out in the claims.

In the accompanying drawings, Figure 1 is a side elevation of my improved dough-dividing-machine; Fig. 2, an end view thereof; Fig. 3, a longitudinal section of the machine; Fig. 4, a cross-section on line 4 4, Fig. 3; Fig. 5, a detail of the intermittent gear for operating the cutter. Fig. 6 is a cross-section on line 6 6, Fig. 3; Fig. 7, a similar section with the partition omitted; Fig. 8, a side view of the partition; Fig. 9, a plan thereof; Fig. 10, a detail of the cutter-shaft and adjoining parts; Fig. 11, an enlarged section on line 11 11, Fig. 10; Fig. 12, a detail of the brush; Fig. 13, a detail of the moistening-pad, and Fig. 14 a section through a modification of the cutter and adjoining parts.

Through a cylindrical feed-chamber 20, which is mounted upon a base 21, extends eccentrically a shaft 22. This shaft is journaled in bearings 23 and receives motion from power-shaft 24 by means of a worm 25 and worm-wheel 26. Shaft 22 carries a drum 27, having diametrically-extending slots or guideways 28, that intersect at right angles and are alined with correspondingly-extending perforations of shaft 22. The drum 27 is flanked by side plates 29, countersunk into the walls of chamber 20. Each guideway accommodates a pair of plungers 30, connected by rods 31, which pass through the perforations of shaft 22. The combined length of each pair of plungers plus their connecting-rods is greater than the diameter of drum 27 and substantially equal to the inner diameter of chamber 20. The relative position of the parts is such that the chamber 20 tangents the eccentric drum 27, so that in this way a curved dough-passage 32 is formed between chamber and drum, which gradually diminishes in width toward the tangential point.

As the drum is rotated the plungers 30 will by contact with the wall of chamber 20 be automatically advanced and retracted to feed the dough introduced through hopper 33 along passage 32 and thence out through an exit-duct 34, which communicates with the passage 32 near the contracted end of the latter.

By the means described the dough will be conveyed from the hopper through the feed-chamber and thence out of the latter to the cutter hereinafter described without being subjected to any objectionable agitation; but owing to the gradual contraction of passage 32 the dough will while being thus fed be subjected to a gradual packing or compression that serves to expel the air.

Above exit-duct 34 there is provided a scraper 35, that engages the surface of drum 27. This scraper is formed by deflecting a section of the inner wall of chamber 20 inward, such deflected section also serving to guide the plungers 30 past the scraper.

Duct 34 opens opposite the cutting mechanism hereinafter described and which serves to subdivide the dough into lengths of suitable size or weight. The duct is of oval form in cross-section, Fig. 7, and can be subdivided into two smaller circular passages by a removable partition 36. This partition has a beak 37, double concave sides 38, and a concave back 39. The partition is intended to be used in shaping the dough for rolls or similar small products.

The cutting mechanism consists of a shaft 40, having right and left threads 41, that engage the tapped hubs 42 of a pair of disks 43. Each disk is provided with preferably four pair of flanges 44, Figs. 3, 10, and 11, arranged at right angles to each other, Fig. 3. Each pair of flanges is separated by an intervening groove 45 of a width equal substantially to twice the thickness of the cutting-blades 46. One of these blades is attached to one flange 44 of one of the disks 43, while a second coöperating blade is attached to the diagonally opposite flange of the other disk, Fig. 11. Thus the blades overlap each other, while their free ends are received within the grooves 45. By adjusting the distance between the disks 43 the length of the cutters represented by the exposed sections of each pair of overlapping blades 46 may be readily increased or diminished.

The outer end of each blade 46 is curved and terminates in a cutting edge 47, Fig. 3, which moves along the curved back 48 of duct 34 and along the curved back 39 of partition 36. These curved backs are arranged concentric to shaft 40 to constitute the fixed members of the cutting mechanism, of which the blades 46 are the movable members.

Upon the rotation of cutter-shaft 40 the pockets 49, formed between blades 46 and side plates 43, will be brought successively into alinement with duct 34, so as to become charged with the dough. Adjustable means are provided for imparting to shaft 40 an intermittent rotary motion, so that these pockets remain stationary while being charged, and the blades do not commence to sever the dough until after the latter has been compressed for a predetermined length of time into the pockets. The means for imparting this intermittent movement to shaft 40 are as follows: Upon power-shaft 24 is mounted a friction-roller 50, longitudinally movable thereon and held against independent rotation by groove and feather 51. Roller 50 is straddled by a fork 52, which in turn is engaged by a set-screw 53, turning in bearings 54 and having hand-wheel 55. Roller 50 contacts with the face of a friction-disk 56, loose on shaft 40 and having a toothed rim 57 to constitute a gear-wheel. By manipulating hand-wheel 55 the distance between roller 50 and axis of wheel 56 is varied to regulate the speed imparted by the roller to the wheel. Wheel 56 intergears with a pinion 58, fast on a counter-shaft 59, carrying the convex member 60 of a Geneva movement, the concave member 61 of which is fast on shaft 40. By the means described the continuous rotary movement of shaft 24 is converted into the desired intermittent rotary movement of shaft 40.

The dough pieces severed by the cutter fall upon an endless conveyer 62, driven by a drum 63, fast on shaft 59.

In order to moisten the cutters, a reservoir 64 delivers water through a lower nozzle 65 upon a pad 66, against which the cutting edges 47 impinge. Pad 66 may be adjusted toward the cutter from time to time to compensate for wear. It is held in position by a clamp-plate 67, perforated below the nozzle and operated by means of thumb-screws 68.

To prevent adhesion of the dough, the pockets 49 when empty are successively dusted with flour contained within a receptacle 69. This receptacle is located vertically above the cutting mechanism and communicates therewith by means of an open bottom provided with one or more screens 70. Above the screens is arranged within receptacle 69 an intermittently-reciprocating brush 71, that prevents clogging. Brush 71 is provided with a tubular head 72, having cam-shaped ends 73, Fig. 12. Head 72 embraces a shaft 74, hung in receptacle 69 and having a pair of pins 75 coacting with cams 73. A fixed feather 76 engaging a groove 77 of head 72 holds the latter against rotation. Shaft 74 receives intermittent rotary movement from the intermittently-rotating shaft 40 by transmission-wheels 78 79 and imparts the desired intermittent reciprocating motion to brush 71 by pins 75 and cams 73.

In the modification of the cutting mechanism shown in Fig. 14 but a single cutter 80 is mounted upon cutter-shaft 81. The latter receives continuous but adjustable rotary movement from friction-roller 50, that engages the face of friction-disk 82, fast on shaft 81. This modification is intended to be used when the dough is not to be compressed within the pockets formed between the blades of the cutter.

It will be seen that my improved machine divides the dough without subjecting it to objectionable agitation, while the degrees to which the dough is compressed and the size of the pieces severed are under the full control of the attendant.

What I claim is—

1. In a dough-dividing machine, a feed-chamber having an inwardly-deflected scraper portion combined with an eccentric drum engaged by the scraper portion and slidable plungers carried by the drum, substantially as shown and described.

2. In a dough-dividing machine, a cylindrical feed-chamber having an inwardly-deflected section to constitute a scraper, combined with an eccentric drum engaged by the scraper, and slidable plungers carried by the drum, substantially as specified.

3. In a dough-dividing machine, a cylindrical feed-chamber and an eccentric shaft, combined with a slotted drum fast on the shaft, side plates secured to the drum, and slidable plungers carried by the drum, substantially as specified.

4. A dough-dividing machine provided with a cylindrical feed-chamber, an inclosed eccentric drum to form an intervening curved and narrowing passage, means for feeding the dough along said passage, an exit-duct communicating with the contracted part of the passage, a cutter opposite the exit-duct, and adjustable means for imparting intermittent rotary movement to the cutter, substantially as specified.

5. A dough-dividing machine provided with a power-shaft, a friction-roller longitudinally movable thereon, means for setting said roller, a friction-disk engaged by the roller, a cutter-shaft, an intervening Geneva movement, and blades carried by the cutter-shaft, substantially as specified.

6. A dough-dividing machine provided with a cutter-shaft having right and left threads, a pair of flanged disks engaging the same, and cutting-blades secured to diagonally opposite disk-flanges, substantially as specified.

7. In a dough-dividing machine, means for feeding the dough and means for cutting the dough, combined with an intermediate partition having concave sides and a beaked front, substantially as specified.

8. A dough-dividing machine provided with a rotating cutter-shaft, a cutting-blade carried thereby, a moistening-pad engaging the blade, and a clamp-plate engaging the pad, substantially as specified.

9. A dough-dividing machine provided with a rotating cutter-shaft, a cutting-blade carried thereby, an upper dusting-receptacle, and a screen at the lower open end of said receptacle, substantially as specified.

10. A dough-dividing machine provided with a rotating cutter-shaft, a cutting-blade carried thereby, an upper dusting-receptacle, a screen at the lower open end of said receptacle, a brush engaging the screen, and means for imparting intermittent reciprocating movement to the brush, substantially as specified.

11. In a dough-dividing machine, a feed-chamber and a drum eccentrically journaled therein and slidable plungers carried by the drum, said cylindrical feed-chamber having an elongated exit-duct in communication therewith, combined with means for cutting the dough arranged at the outlet of the exit-duct, means for dusting the cutting means and means for moistening the cutting means, substantially as shown and described.

12. In a dough-dividing machine, a casing having an internal cylindrical chamber, an eccentric drum journaled therein, slidable plungers carried by said drum, said casing having an elongated exit-duct communicating with said chamber, a rotatable cutter having pockets, arranged to coöperate with the outlet of the exit-duct, means for rotating the drum and means for intermittently rotating the cutting means, substantially as shown and described.

13. In a dough-dividing machine, a casing having an internal cylindrical chamber, an eccentric drum journaled therein, slidable plungers carried by said drum, said casing having an elongated exit-duct communicating with said chamber, a rotatable cutter having pockets, arranged to coöperate with the outlet of the exit-duct, means for rotating the drum and means for intermittently rotating the cutting means, and means for dusting the cutter, substantially as shown and described.

14. In a dough-dividing machine, a casing having an internal cylindrical chamber, an eccentric drum journaled therein, slidable plungers carried by said drum, said casing having an elongated exit-duct communicating with said chamber, a rotatable cutter having pockets, arranged to coöperate with the outlet of the exit-duct, means for rotating the drum and means for intermittently rotating the cutting means, and means for dusting the cutter, and means for moistening the cutter, substantially as shown and described.

15. In a dough-dividing machine, a casing having a cylindrical feed-chamber provided with a hopper-like mouth, said casing having an elongated exit-duct communicating with the feed-chamber, an eccentric drum journaled in the feed-chamber, slidable plungers carried by the drum, said casing having a projecting scraper portion for coöperating with the drum, a rotary cutter coöperating with the outlet of the exit-duct, a cutter-dusting mechanism coöperating with said cutter and a cutter-moistening mechanism also coöperating with said cutter, and means for imparting motion to said drum and said cutter, substantially as shown and described.

16. In a dough-dividing machine, a casing having a cylindrical feed-chamber provided with a hopper-like mouth, said casing having an elongated exit-duct communicating with the feed-chamber, an eccentric drum journaled in the feed-chamber, slidable plungers carried by the drum, said casing having a projecting scraper portion for coöperating with the drum, a rotary cutter coöperating with the outlet of the exit-duct, a cutter-dusting mechanism coöperating with said cutter and a cutter-moistening mechanism also coöperating with said cutter, and means for imparting motion to said drum and said cutter, and a partition member, removably held within said duct, substantially as shown and described.

17. In a dough-dividing machine, means for cutting the dough, and means for feeding it to the cutting means, said feeding means including a conveying-duct, combined with a partition in said duct, substantially as specified.

18. In a dough-dividing machine, means for feeding the dough combined with means for cutting the dough, and means for conveying the cut dough away from the cutting means, together with means for dusting the cutting means, substantially as shown and described.

19. In a dough-dividing machine, means for feeding the dough combined with means for cutting the dough, and means for conveying the cut dough away from the cutting means, together with means for dusting the cutting means, and means for moistening the cutting means, substantially as shown and described.

Signed by me at New York city, Manhattan, New York, this 23d day of May, 1906.

HERMAN F. W. HUEG.

Witnesses:
FRANK V. BRIESEN,
WILLIAM SCHULZ.